United States Patent

Amaoka et al.

[19]

[11] Patent Number: 6,114,012
[45] Date of Patent: Sep. 5, 2000

[54] RIB OF COMPOSITE MATERIAL AND METHOD OF FORMING THE SAME

[75] Inventors: Kazuaki Amaoka; Yasuo Isano, both of Utsunomiya, Japan

[73] Assignee: Fuji Jukogyo Kabushiki Kaisha, Japan

[21] Appl. No.: 09/036,018

[22] Filed: Mar. 6, 1998

[30] Foreign Application Priority Data

Mar. 19, 1997 [JP] Japan ..................................... 9-065957

[51] Int. Cl.⁷ ................................ B32B 3/28; B32B 3/30
[52] U.S. Cl. ..................... 428/182; 428/174; 428/122; 52/720.1; 52/739.1; 52/733.2; 244/119; 244/123; 264/258; 264/324
[58] Field of Search .................................. 428/122, 182, 428/174, 178; 52/720.1, 739.1, 733.2; 244/119, 117, 123; 264/257, 258, 324

[56] References Cited

U.S. PATENT DOCUMENTS 2,102,936  12/1937  Bailey ...................................... 428/122

FOREIGN PATENT DOCUMENTS 3-83624A   4/1991  Japan .
3-126532A  5/1991  Japan .

*Primary Examiner*—Ellis Robinson
*Assistant Examiner*—Laura L. Lee
*Attorney, Agent, or Firm*—Smith, Gambrell & Russell, LLP

[57] ABSTRACT

A rib of a composite material for a box structure such as an airfoil has, in an integral structure, a web and flanges formed so as to extend along opposite longitudinal side edges of the web. The web is provided with a plurality of parallel first ridges or beads formed so as to extend across the web and to protrude outward from the outer surface of the web, and each of the flanges is provided with a plurality of parallel second ridges formed so as to extend across the flange, to protrude inward from the outer surface thereof and to merge into the corresponding first ridges. The structure eliminates causes of wrinkles and provides an increased strength.

19 Claims, 7 Drawing Sheets

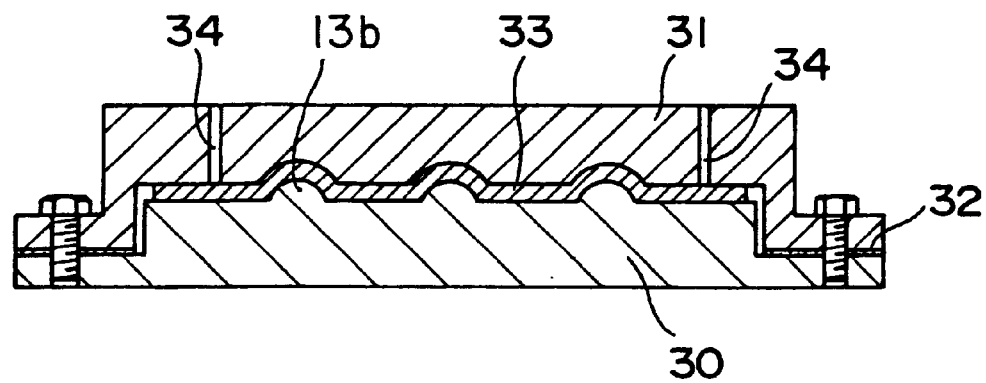
F I G. 10
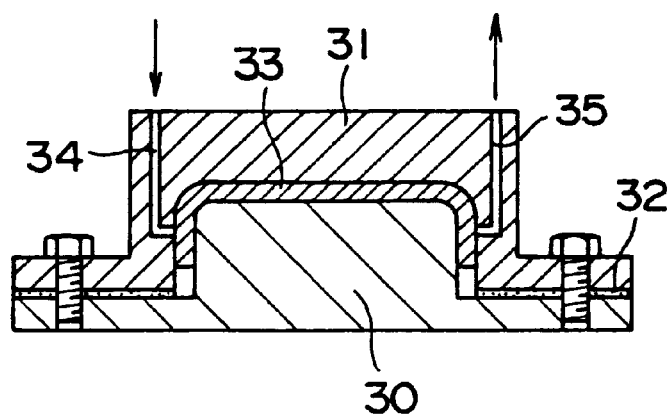
F I G. 11

RIB OF COMPOSITE MATERIAL AND METHOD OF FORMING THE SAME

BACKGROUND OF THE INVENTION

1. Field of the Invention

The present invention relates to a rib of a composite material for a box structure, such as an airfoil, and a method of forming such a rib by molding.

2. Description of the Related Art

A known technical measure for enhancing the buckling strength of a channel-shaped rib for an aircraft structure or the like forms beads, i.e., strengthening protrusions, perpendicularly to the length of the rib.

As shown in FIG. 12, a channel-shaped rib 1 has a web 2, flanges 3 formed so as to extend along the opposite longitudinal side edges of the web 2, and a plurality of ridges or beads 4 formed in the web 2 at intervals. If the beads 4 are formed when forming the rib 1, the arc length L1 (FIG. 13) of the beads 4, i.e., length across the bead along the surface of the web 2, is greater than the chord length L2 of the same along the surface of the flange 3, i.e., width.

When forming the rib 1 shown in FIG. 12 by molding a prepreg plate 5 (FIG. 14) prepared by impregnating carbon fiber fabrics or glass fiber fabrics with a synthetic resin by a molding process, the prepreg plate 5 is unable to absorb the difference between the arc length $L_1$ and the chord length L2 because the prepreg plate 5 is scarcely stretchable when the beads 4 are formed. Consequently, wrinkles are formed in portions of the web 2 around the corners of the beads 4 of the rib 1 and it is very difficult to smooth the wrinkles in the molding process. A technical measure for preventing the formation of wrinkles in the portions of the prepreg plate 5 around the corners of the beads 4 forms cuts 6 in the portions of the prepreg plate 5 around the corners of the beads 4 as shown in FIG. 14 to absorb the difference between the arc length $L_1$ and the chord length $L_2$ when forming the beads 4.

JP 3-83624A and 3-126532A disclose composite material molding methods which form strengthening ridges in the web by disposing a prepreg plate with its fibers extended bias, i.e., substantially at an angle of 45°, to the edges along which the web and the flanges intersect and by molding the prepreg plate, using a mold and an auxiliary mold.

If the channel-shaped rib 1 shown in FIG. 12 is to be used as a rib for a box structure, such as an airfoil, in most cases, a recess 7 (FIG. 15) is formed in the web 2, the rib 1 is attached to a skin plate 8, and a longitudinal member 9 is attached to the skin plate 8 so as to extend through the recess 7 formed in the web 2.

The technical measure which forms the cuts in portions of the prepreg plate around the corners of the beads before subjecting the prepreg plate to a molding process needs an additional cutting process, reduces the strength of the portions of the prepreg plate around the corners of the beads because the component fibers in the same portions of the prepreg plate are cut, increases the number of the laminated component prepreg sheets of the prepreg plate to compensate for the reduction of the strength of the portions of the prepreg plate around the corners of the beads due to the formation of the cuts, inevitably needs increased time and labor for fabricating the rib of the composite material, and increases the weight of the rib.

The method of forming a rib of a composite material which forms reinforcing ridges, i.e., beads, in the web of the rib enables smoothing out wrinkles if the prepreg plate is disposed with the reinforcing fibers thereof extended bias, i.e., substantially at an angle of 45°, to the edges along which the web and the flanges intersect. However, if the prepreg plate is disposed with its reinforcing fibers extended in parallel or perpendicularly to the edges, large wrinkles are formed because wrinkles cannot be smoothed out and the difference between the arc length of the beads along their surfaces and the chord length, i.e., the width, of the beads along the flange cannot be absorbed. Furthermore, if the recess 7 is formed in the web 2 to use the rib 1 as a member of a box structure, such as an airfoil, the strength of the web 2 is reduced significantly and cracks may develop.

SUMMARY OF THE INVENTION

Accordingly, it is an object of the present invention to provide a rib of a composite material having a web firmly strengthened with ridges, i.e., beads, capable of eliminating causes of wrinkles which develop due to the difference between the actual length of the web provided with the ridges in its surface and the actual length of the flanges along their surfaces.

Another object of the present innovation is to provide a method of forming a rib of a composite material having a web firmly strengthened with ridges, and flanges extending along the opposite side edges of the web.

According to one aspect of the present invention, a rib of a composite material has, in an integral structure, a web, and flanges formed so as to extend along opposite side edges of the web. In this rib, the web is provided with a plurality of first ridges formed to extend across the web and to protrude on an outer side of the rib, and each of the flanges is provided with a plurality of second ridges formed so as to extend across the flanges, to protrude on an inner side of the rib and to merge into the corresponding first ridges. Thus, the problems in the prior art resulting from the development of wrinkles in the web due to the difference between the actual length of the web provided with the beads and that of the flanges can be solved, and the web is strengthened firmly by the ridges.

In this rib, the flanges are formed so as to extend on the same side of the web to form the rib in the shape of a channel, the first ridges of the web are protruded from the outer surface of the web, and the second ridges of the flanges may form furrows in the outer surfaces of the flanges. In this rib, the first ridges of the web and the second ridges of the flanges may be of the same arcuate shape in cross section.

According to a second aspect of the present invention, a method of forming a rib of a composite material comprises the steps of laying up prepreg sheets, i.e., fiber-reinforced plastic sheets, in a laminated prepreg structure on an outer surface of a mandrel provided on the outer surface with ridges perpendicular to a longitudinal direction thereof and provided in side surfaces with furrows merging into corresponding ridges formed on the outer surface; disposing over the mandrel a flange forming tool having rollers each provided with annular ridges to be fitted in the furrows formed in the side surface of the mandrel, and having cylindrical portions to be brought into contact with the side surface of the mandrel over the mandrel; bending opposite side portions of the laminated prepreg structure so as to conform to an external shape of the mandrel by moving the flange forming tool against the mandrel; applying heat and pressure, for molding, to the laminated prepreg structure thus formed on the mandrel; and hardening the thus molded rib.

According to a third aspect of the present invention, a method of forming a rib of a composite material having a web and opposite side flanges on the web, comprises the steps of laying up dry fabrics in a dry fabric structure in a molding cavity formed between a male mandrel and a female mandrel, the molding cavity including a portion defining a ridge forming space for forming on the web ridges perpendicular to a longitudinal direction of the web and side portions defining furrow forming spaces for forming on the flanges furrows merging into the ridges, respectively; injecting a thermosetting resin into the molding cavity to impregnate the dry fabric structure with a thermosetting resin; applying heat and pressure to the fabric structure impregnated with the thermosetting resin; and hardening the fabric structure impregnated with a thermosetting resin.

Preferred embodiments of the present invention will be understood from the following detailed description referring to the accompanying drawings.

BRIEF DESCRIPTION OF THE DRAWINGS

FIG. 10 is a longitudinal sectional view of a mold employed in carrying out a resin impregnation molding method to form a rib of a composite material according to the present invention;

FIG. 11 is a cross-sectional view of the mold of FIG. 10;

DESCRIPTION OF THE PREFERRED EMBODIMENTS

Figure 1:
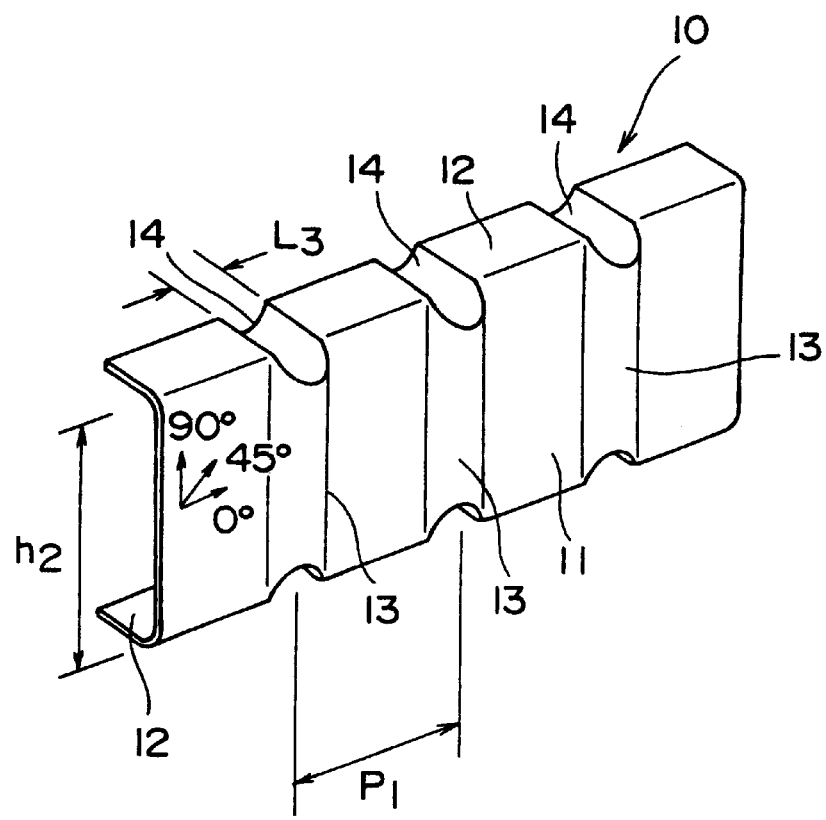
FIG. 1 is a perspective view of a rib of a composite material in a preferred embodiment according to the present invention.

Referring to FIG. 1, a rib 10 in a preferred embodiment according to the present invention is a component member of a box structure and has a web 11 of a height $h_2$, and flanges 12 formed integrally with the web 11 so as to extend along the opposite side edges of the web 11. The web 11 has a plurality of parallel first beads 13, i.e., first ridges, having a length substantially equal to the height h2 of the web 11. The ridges 13 are formed at a pitch $P_1$ in the web 11 so as to extend across the web 11. A plurality of second beads 14, i.e., second ridges, are formed in each of the flanges 12 so as to extend across the flange 12 and to merge into the first beads 13 of the web 11, respectively.

Figure 2:
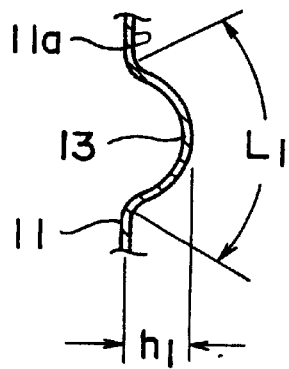
FIG. 2 is a sectional view of a first ridge formed in a web of the rib of FIG. 1.
Figure 3:
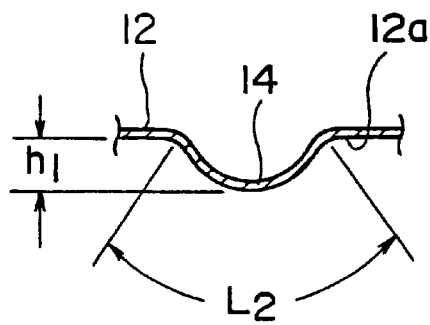
FIG. 3 is a sectional view of a second ridge formed in a flange of the rib of FIG. 1.

As shown in FIG. 2, the first beads 13 protrude outward from an outer surface 11a of the web 11 and have a cross section of the shape of a circular arc. Each of the first beads 13 has a height $h_1$, an arc length $L_1$, i.e., actual length, and a chord length $L_3$ (FIG. 1), i.e., width. As shown in FIG. 3, the second beads 14 protrude inward from a surface 12a of the flange 12 and have a cross section of the shape of a circular arc. Each of the second beads 14 has a height $h_1$ and an arc length $L_2$. In the channel-shaped rib 10 in this embodiment, L1=62 mm, L2=62 mm, L3=40 mm, $h_1$=20 mm, h2=200 mm and P1=150 mm.

A laminated prepreg structure 22 (FIG. 4) for forming the rib 10 is formed by laying up six CFRP (carbon fiber reinforced plastic) sheets each formed by impregnating a plane-weave carbon fiber fabric with a thermosetting epoxy resin with fiber orientations of ±45°. 0°/90°, ±45°, ±45°, 0°/90° and ±45°. In this channel-shaped rib 10, the arc length L1 of the first beads 13 of the web 11 is equal to the arc length L2 of the second beads 14 of the flanges 12, and carbon fibers forming the plane-weave carbon fiber fabrics have the same fiber length. Therefore, wrinkles are not formed in the rib 10. The first beads 13 extend across the web 11 and have a length substantially equal to the height h2 of the web 11, so that the first beads 13 serve as strong strengthening means. Joints of the first beads 13 of the web 11 and the corresponding second beads 14 of the flanges 12 are formed in a gentle curve and thus prevent bending of the component fibers of the plane-weave carbon fiber fabrics.

Figure 4:
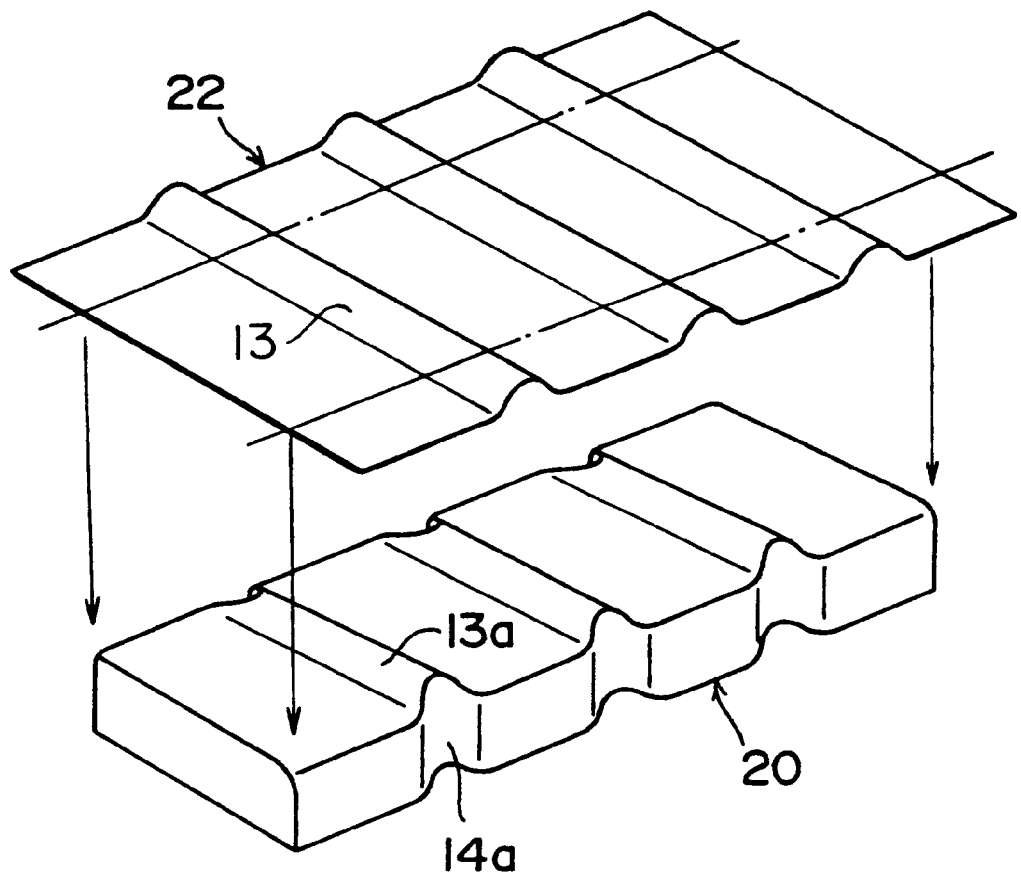
FIG. 4 is a perspective view explaining a process for laying up prepreg sheets in a laminated prepreg structure over a male mandrel when forming the rib of a composite material according to the present invention.

A method of forming the channel-shaped rib 10 of FIG. 1 by molding will be described hereafter with reference to FIGS. 4 to 7. A laminated prepreg structure 22 is bent by using a male mandrel 20 of a metal and a flange forming tool 21 shown in FIGS. 6 and 7. As shown in FIG. 4, the male mandrel 20 has an external shape corresponding to the shape of the channel-shaped rib 10, and is provided with parallel protrusions 13a for forming the first beads 13 of the web 11, and furrows 14a for forming the second beads 14 of the flanges 12.

Figure 6:
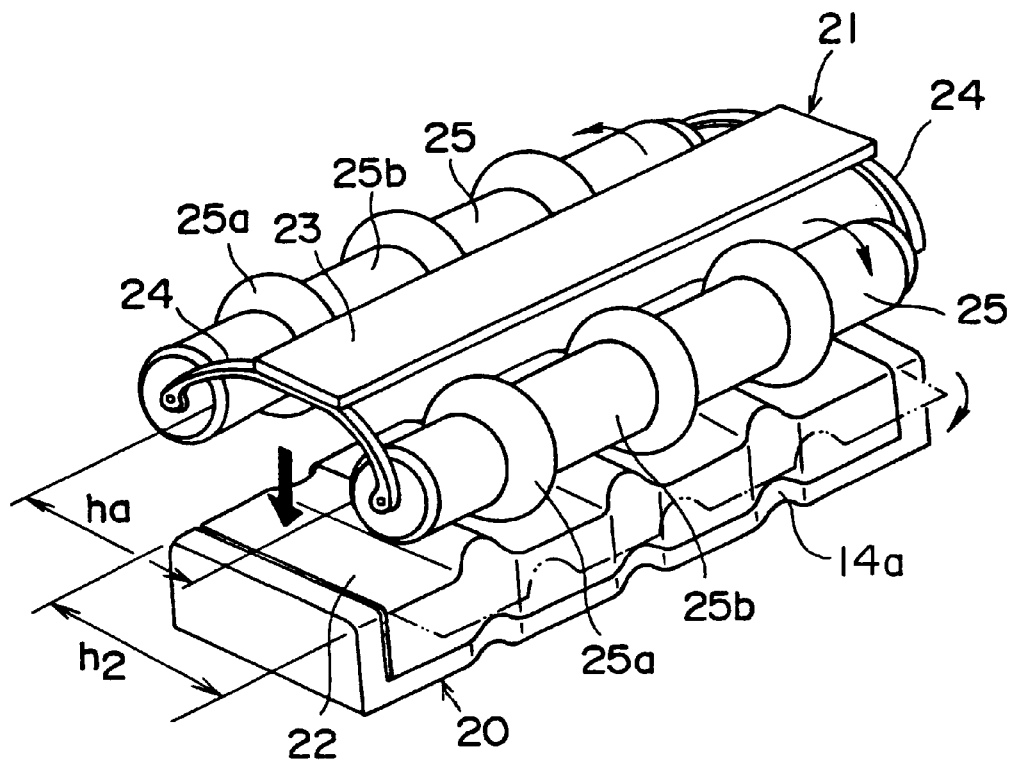
FIG. 6 is a perspective view of a flange forming tool.
Figure 7:
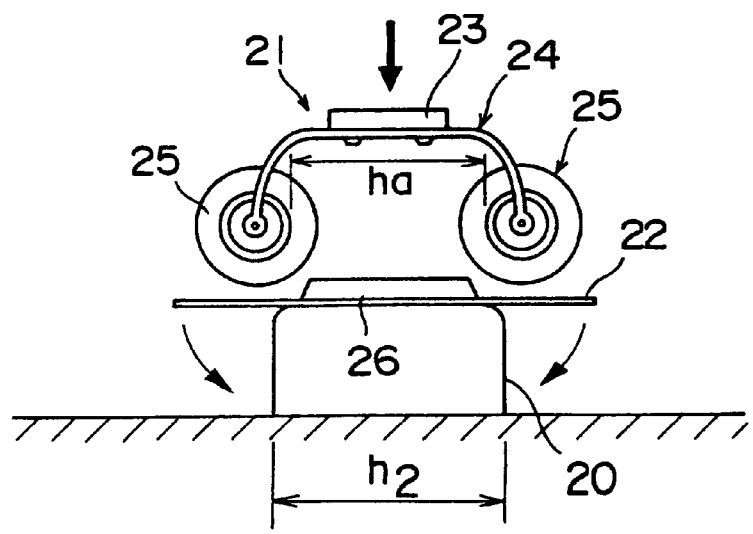
FIG. 7 is an end view of the flange forming tool of FIG. 6.

Referring to FIGS. 6 and 7, the flange forming tool 21 has a support plate 23, and a pair of support arms 24 extending from the support plate 23 and having a shape substantially resembling a circular arc with middle portions fixed to the opposite ends of the support plate 23, respectively. A pair of rollers 25 are rotatably supported on the opposite ends of the pair of support arms 24, respectively. Each of the rollers 25 has annular ridges 25a having a cross section of a shape corresponding to the shape of the cross section of the second beads 14, and cylindrical portions 25b to be brought into contact with the side surfaces of the male mandrel 20. The surfaces of the rollers 25 are coated with a silicone rubber coating. As mentioned above, the laminated prepreg structure 22 is a fiber-reinforced laminated structure formed by laying up CFRP sheets each formed by impregnating a plane-weave carbon fiber fabric with a thermosetting epoxy resin.

The component CFRP sheets of the laminated prepreg structure 22 are laid up on the male mandrel 20 so that ridges corresponding to the first beads 13 of the web 11 are formed in the laminated prepreg structure 22 as shown in FIG. 4. Subsequently, opposite side portions of the laminated prepreg structure 22 provided with the ridges corresponding to the first beads 13 are bent so that the opposite side portions of the laminated prepreg structure 22 are shaped into the shape of the flanges 12 provided with the second beads 14. Although this flange forming step may be carried out manually, the use of the flange forming tool 21 will curtail time and labor for carrying out the flange forming process.

Referring to FIG. 7, when forming the flanges 12 provided with the second beads 14, the laminated prepreg structure 22 provided with the ridges corresponding to the first beads 13 is laid in place on the male mandrel 20, and a pressing member 26 is put on the laminated prepreg structure 22 to hold the laminated prepreg structure 22 fixedly at a predetermined position. The flange forming tool 21, is adjusted such that the rollers 25 are spaced a distance ha smaller than the height $h_2$ of the web 11. Then the tool 21 is disposed above the laminated prepreg structure 22, and lowered in the direction of the arrow shown in FIG. 6 or 7 so that the opposite side portions of the laminated prepreg structure 22 indicated by alternate long and two short dashes lines in FIG. 6 are bent and formed by the rollers 25 in the shape of the flanges 12 provided with ridges corresponding to the beads 14 indicated by solid lines in FIG. 6. The ridges corresponding to the second beads 14 are formed by pushing portions of the side portions of the laminated prepreg structure 22 by the annular ridges 25a in the furrows 14a formed in the side surfaces of the male mandrel 20.

Figure 5:
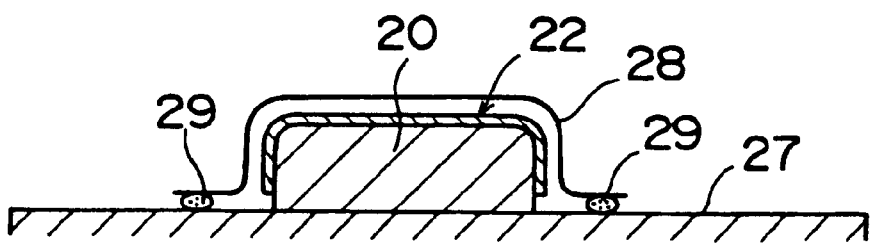
FIG. 5 is a sectional view explaining an autoclave molding process for molding, in an autoclave, a laminated prepreg structure formed by laying up prepreg sheets.

After the six CFRP sheets forming the laminated prepreg structure 22 have been thus laid up and shaped, the shaped laminated prepreg structure 22 is mounted on a surface plate 27 as shown in FIG. 5, the shaped laminated prepreg structure 22 is covered entirely with a heat-resistant backpack 28, and a dam 29 is formed around the male mandrel 20 on the surface plate 27. Then, the space enclosed by the heat-resistant backpack 28 is evacuated in a vacuum of a pressure lower than the atmospheric pressure by 560 mmHg or above in order that air remaining in the laminated prepreg structure 22 is removed, and then the laminated prepreg structure 22 is heated for thermosetting at a temperature of 180° and at a pressure of 3.2 atm to complete the rib 10.

Figure 8:
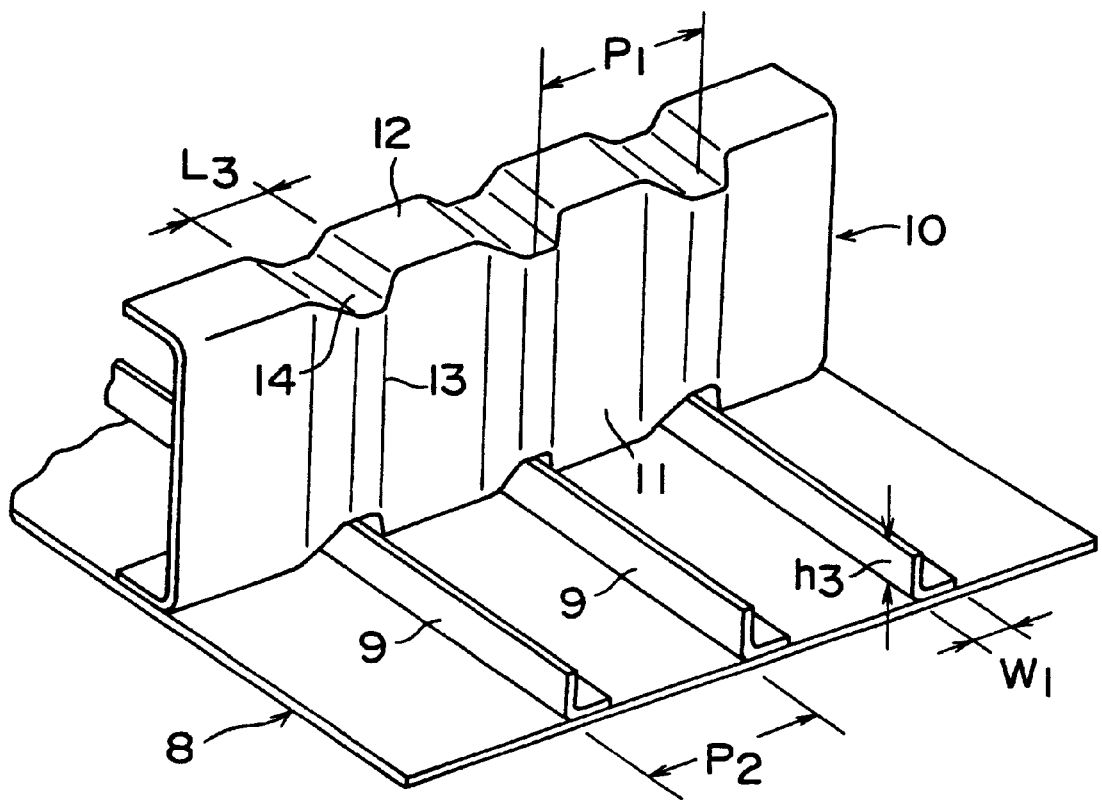
FIG. 8 is a perspective view of a rib of a composite material according to the present invention in a practical application.
Figure 9:
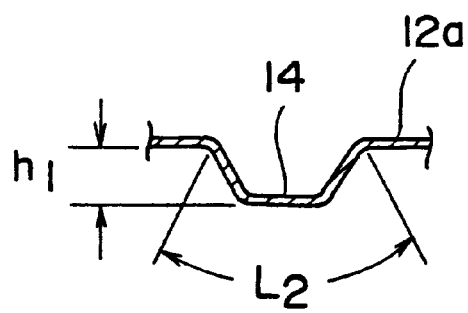
FIG. 9 is a sectional view of a flange included in the rib of FIG. 8.
Figure 12:
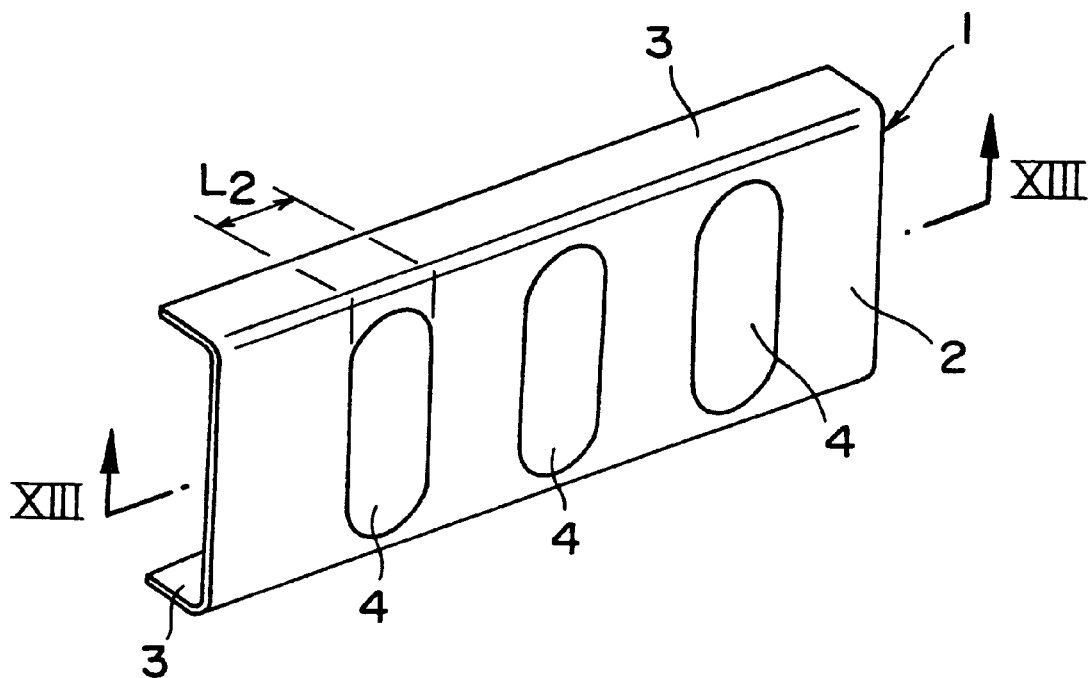
FIG. 12 is a perspective view of a conventional rib of a composite material.
Figure 13:
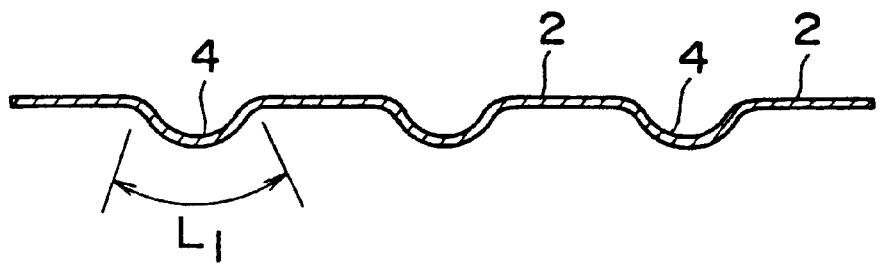
FIG. 13 is a sectional view taken on line XIII—XIII in FIG. 12.
Figure 14:
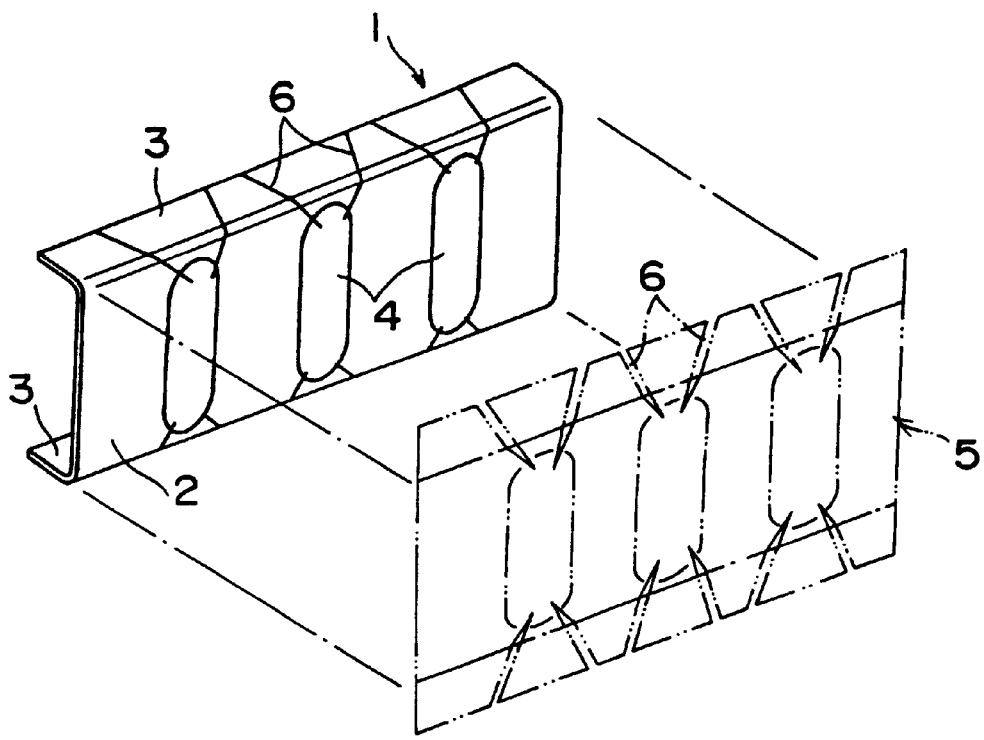
FIG. 14 is a perspective view of another conventional rib of a composite material.
Figure 15:
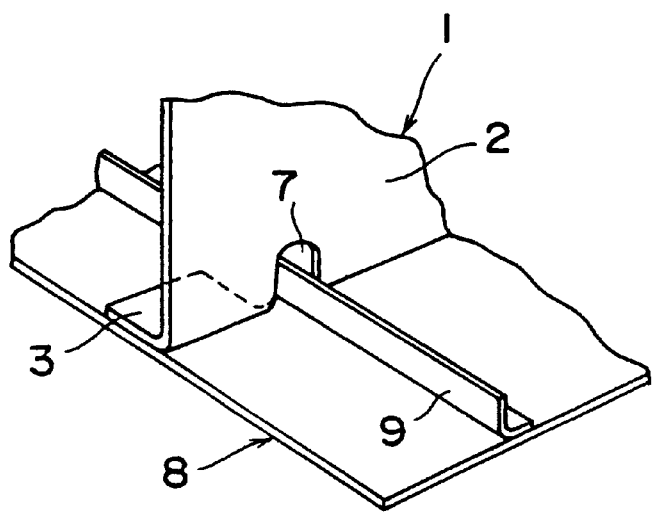
FIG. 15 is a perspective view of a conventional rib of a composite material in a practical application.

FIG. 8 illustrates, by way of example, the use of recesses defined by the second beads 14 formed in the flange 12 of the channel-shaped rib 10 as attached to a skin plate 8 as openings through which longerons 9 are extended. Furrows are formed in the surface 12a of the flange 12 because the second beads 14 are protruded inward from the surface 12a of the flange 12. In this embodiment, the second beads 14 are formed at a pitch $P_1$ equal to the pitch P2 of the longerons 9 in a trapezoidal cross section as shown in FIG. 9 so that spaces suitable for extending the longerons 9 of a width $W_1$ and a height $h_3$ therethrough are formed between the second beads 14 and the skin plate 8. The strength of the channel-shaped rib 10 of the present invention is not reduced and cracks will not develop in the rib 10 because any recesses to extend the longerons 9 therethrough need not be formed additionally in the channel-shaped rib 10.

FIGS. 10 and 11 illustrate a molding method by resin impregnation, for forming a channel-shaped rib 10 of the present invention. The molding method by resin impregnation employs a male mandrel 30 provided with ridges 13b corresponding to the first beads 13 and furrows corresponding to the second beads 14, and a female mandrel 31 provided with furrows and ridges respectively complementary to the ridges and the furrows of the male mandrel 30. A dry fabric structure 33 is formed by laying up dry fabrics in a sealed space to be formed between the male mandrel 30 and the female mandrel 31 placed on a gasket 32 put on a parting surface of the male mandrel 30, a molten thermosetting resin is injected through a resin injection passage 34 into the sealed space to impregnate the dry fabric structure 33 with the thermosetting resin to form the channel-shaped rib 10 by molding.

As is apparent from the foregoing description, the molding of a composite material according to the present invention has the web, and the flanges formed so as to extend along the opposite side edges of the web, the first ridges are formed in the web so as to extend across the web and to protrude outward from the surface of the web, and the second ridges are formed in the flanges so as to extend across the flanges, to protrude inward from the surfaces of the flanges and to merge into the corresponding first ridges. Therefore, the invention eliminates causes of wrinkles which develop due to the difference between the actual length of the web provided with the beads in its surface and the actual length of the flanges, and the web is strengthened by the beads.

The first method of forming the rib of the present invention lays up prepreg sheets in the laminated prepreg structure on an upper surface of the mandrel provided with ridges thereon and provided in its side surfaces with furrows merging into the corresponding ridges formed in the upper surface, bends the opposite side portions of the laminated prepreg structure so as to conform to the external shape of the mandrel by a flange forming tool, applies heat and pressure to the laminated prepreg structure for molding, and hardens the molded laminated prepreg structure. Therefore, the first method is able to produce the rib of the present invention having the web strengthened by the beads without requiring additional time and labor and without increasing the weight of the rib.

The second method of forming the rib of the present invention lays up dry fabrics in a dry fabric structure in the molding cavity formed between a male mandrel and a female mandrel, and having an upper portion forming a bead forming space for forming the beads on the web of the rib and side portions forming furrow forming spaces for forming furrows merging into the corresponding beads; injects a thermosetting resin into the molding cavity to impregnate the dry fabric structure with the thermosetting resin, applies heat and pressure to the fabric structure impregnated with the thermosetting resin; and hardens the fabric structure impregnated with the thermosetting resin. Therefore, the second method is able to produce the rib of the present invention having the web strengthened by the beads without requiring additional time and labor and without increasing the weight of the rib.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A channel-shaped rib of a composite material having, in an integral structure, a web extending in a lengthwise direction of the rib, and flanges formed on, and extending along, opposite lengthwise edges of the web to provide a channel shape; said rib comprising:

a plurality of spaced apart first beads extending across the web, each of said first beads having an outer surface protruding outward from an outer surface of said web on a remote side from an interior space of said channel shape;

a plurality of spaced apart second beads extending across each of said flanges, said second beads protruding inward from an inner surface of each flange on the same side as said interior space of the channel shape, each of said second beads having an inner surface protruding into said interior space and having an outer surface defining a recess formed in the outer surface of each of the flanges; and said second beads being positioned so as to merge with respective first beads.

2. The rib of a composite material according to claim 1 wherein: said first and second ridges extend transversely to the lengthwise direction.

3. The rib of a composite material according to claim 1, wherein:

each of said first ridges has a cross-sectional shape of a circular arc.

4. The rib of a composite material according to claim 1, wherein;

each of said second ridges has a cross-sectional shape of a circular arc.

5. The rib of a composite material according to claim 1, wherein:

said first and second ridges merge with each other in a gentle curve.

6. A method of forming the rib as defined in claim 1, comprising the steps of:

laying up prepreg sheets in a laminated prepreg structure on an outer surface of a mandrel provided on said outer surface with ridges perpendicular to a longitudinal direction thereof and provided in side surfaces thereto with furrows merging into corresponding ridges formed on said outer surface;

disposing over said mandrel a flange forming tool having rollers each provided with annular ridges to be fitted in the furrows formed in said side surface of the mandrel, and having cylindrical portions to be brought into contact with the side surface of the mandrel;

bending opposite side portions of the laminated prepreg structure so as to conform to an external shape of the mandrel by moving said flange forming tool against said mandrel, to thereby form said web with said first beads thereon and said flanges with said second beads thereon;

applying heat and pressure, for molding, to the laminated prepreg structure thus formed on the mandrel; and hardening the thus molded rib.

7. The method of forming a rib according to claim 6, wherein;

said rollers have a silicone rubber coating thereon.

8. A method of forming the rib as defined in claim 1, said method comprising the steps of:

laying up dry fabrics in a dry fabric structure in a molding cavity formed between a male mandrel and a female mandrel, said molding cavity including a portion defining a ridge forming space for forming on said web said first beads such that said first beads extend perpendicular to a longitudinal direction of the web and side portions defining furrow forming spaces for forming on said flanges said second beads such that said second beads merege into respective first beads;

injecting a thermosetting resin into the molding cavity to impregnate the dry fabric structure with the thermosetting resin to obtain the rib;

applying heat and pressure to the fabric structure impregnated with the thermosetting resin; and hardening the fabric structure impregnated with the thermosetting resin.

9. A rib as defined in claim 1 wherein the composite material includes fiber-reinforced plastic material.

10. A rib as defined in claim 9 wherein the plastic material is a thermosetting resin.

11. A box structure which includes a plurality of the ribs defined in claim 1, said box structure further including plates defining a shell of the box structure, and said ribs being provided within said shell and attached to said plates to provide rigidity to said box structure.

12. A box-stricture as recited in claim 11 wherein said plates are skin plates that define an aircraft airfoil and said ribs are attached to an internal surface of said skin plates, and said box-structure further comprising longerons fixed to an internal surface of said skin plates.

13. The box structure as recited in claim 12, wherein said longerons extend through said recesses formed in the outer surface of said flanges.

14. The box structure as recited in claim 13 wherein each recess in said ribs has a longeron extending therethrough.

15. A channel-shaped rib of a composite material having, in an integral structure, a web extending in a lengthwise direction of the rib, and flanges formed on, and extending along, opposite lengthwise edges of the web to provide a channel shaped rib with an interior channel space; said rib comprising:

a first set of spaced apart beads extending across the web;

a second set of spaced apart beads extending across each of said flanges;

said sets of beads being arranged so that one of said first and second sets of beads protrudes inwardly into the interior channel space defined by the channel shaped rib while a remaining one of said first and second sets of beads extends in a direction away from the interior space and out away from an outer surface of said channel shaped rib of composite material; and wherein beads of said first set of beads merge with respective beads of said second set of beads.

16. A rib as defined in claim 15 wherein said first and second sets of beads extend transversely to the lengthwise direction.

17. A rib as defined in claim 15 wherein merging respective beads of said first and second sets of beads are aligned and said beads of said first set are equally spaced apart along the lengthwise direction.

18. A rib as defined in claim 15 wherein the composite material includes fiber-reinforced plastic material.

19. A rib as defined in claim 18 wherein the plastic material is a thermosetting resin.

* * * * *